April 27, 1954

H. E. KELTNER 2,676,859

DISK RECORD STORAGE CABINET

Filed Dec. 22, 1949

INVENTOR.
Harold E. Keltner
BY Thos. E. Scofield
ATTORNEY.

Patented Apr. 27, 1954

2,676,859

UNITED STATES PATENT OFFICE 2,676,859

DISK RECORD STORAGE CABINET

Harold E. Keltner, Kansas City, Mo.

Application December 22, 1949, Serial No. 134,401

12 Claims. (Cl. 312—13)

Figure 2:
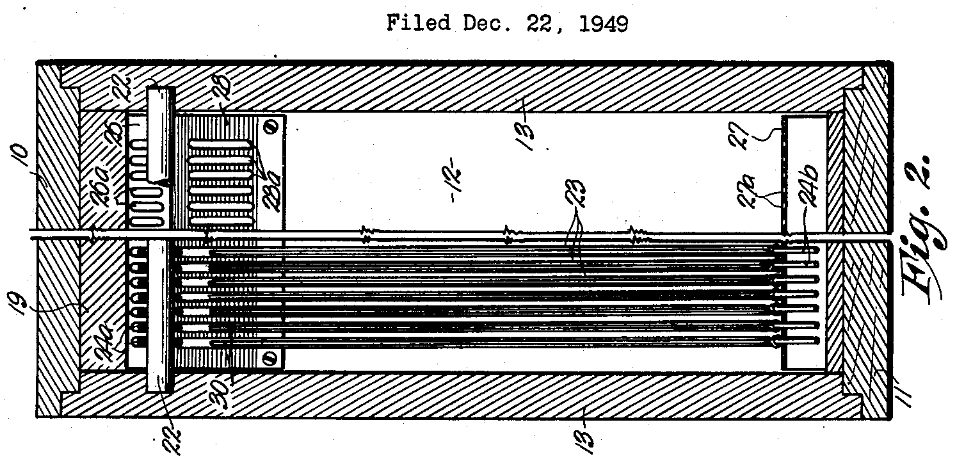

The present invention relates in general to storage of articles and it deals more particularly with storage cabinets for disk-type phonograph records.

It is an object of the invention to provide a holder for records of the character indicated, which will protect the records against injury, which is attractive in appearance and which requires a minimum of space for a given number of records.

Another object is to provide a record storage cabinet which has indexing means whereby any desired record may readily and easily be found, and means facilitating the replacement of records in their proper places.

A feature of the invention resides in the provision of individual envelopes for the storage of records and an arrangement which automatically marks an envelope when the record is removed therefrom so that the empty envelope may quickly be located in the group.

A further object is to provide a cabinet having record receiving envelopes therein together with an arrangement normally preventing removal of the envelopes with the records but permitting ready removal of the envelopes for replacement if necessary.

Other and further objects are achieved, will appear in the course of the following description of the invention.

Figures 1, 3, 4:
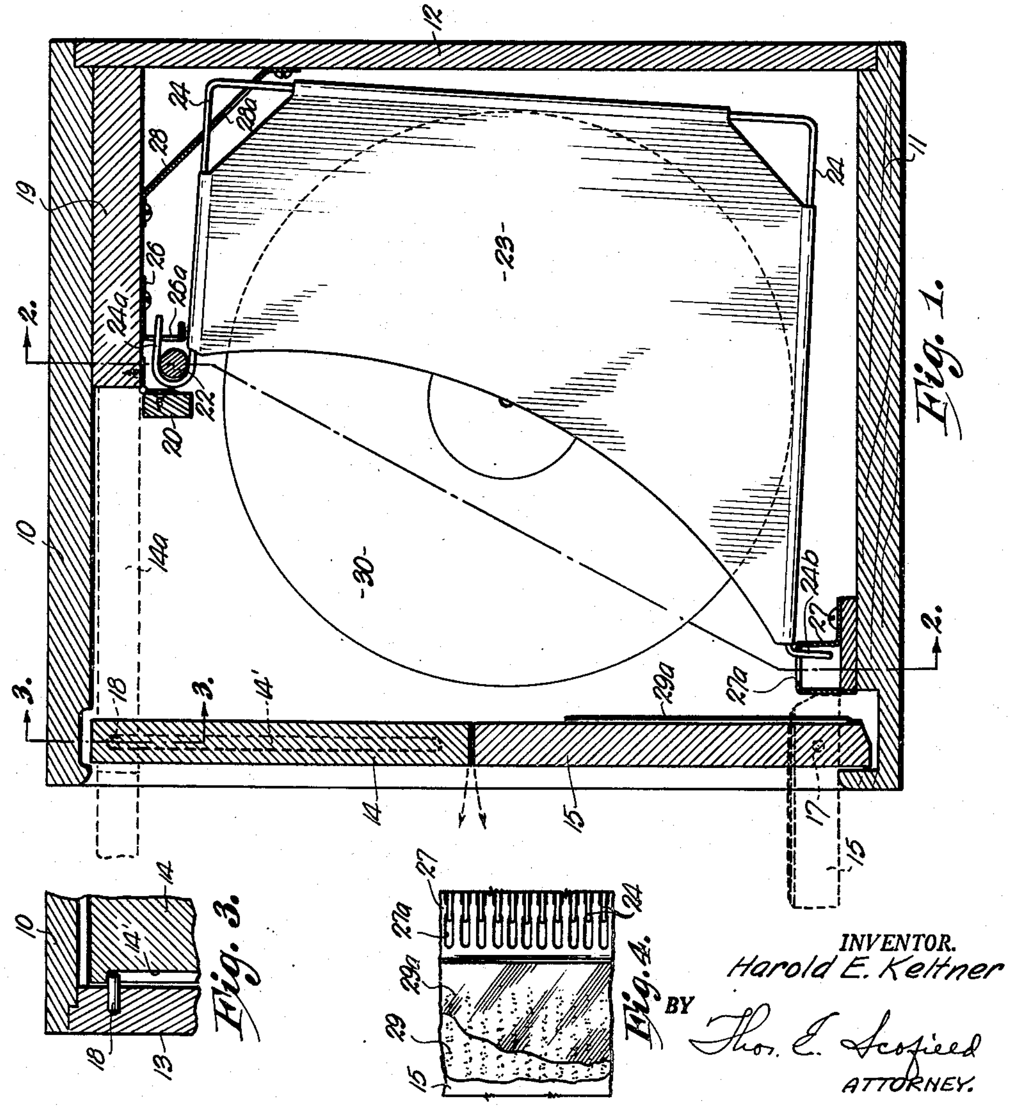

In the accompanying drawings which form a part of the specification and are to be read in conjunction therewith, and in which like reference numerals are employed to identify like parts of the various views:

Fig. 1 is a vertical cross sectional view of a record cabinet embodying my invention, Fig. 2 is a cross sectional view of the cabinet taken along the line 2—2 of Fig. 1 in the direction of the arrows, part of the record envelopes being omitted for purposes of illustration, Fig. 3 is a fragmentary cross sectional view taken along the line 3—3 of Fig. 1 in the direction of the arrows, and Fig. 4 is a fragmentary plan view of the lower cabinet door showing same in open condition.

Referring more particularly to the drawings, my cabinet has a top 10, a bottom 11, a back 12 and two ends 13 joined together in any conventional or suitable fashion to form a rectangular enclosure opening at the front. The front opening is provided with an upper door 14 and a lower door 15 which when closed as shown in Fig. 1 are in vertical alignment with their edges substantially abutting. The lower door is adapted to swing downwardly about a fixed pivot 17 to horizontal position as shown by dotted lines. The upper door is supported by pins 18 carried by the end walls 13 and extending into elongated slots or recesses 14[1] in the lateral edges of the door; thus its lower edge may be swung outwardly, and when the door reaches its upper horizontal position, it may be pushed backwardly along a horizontal plane until it is fully housed within the cabinet beneath the top, as shown by dotted lines 14a. In this position its rearmost edge abuts against the batten member 19 and is supported by a strip 20 which is hinged to the batten.

Extending crosswise of the cabinet just below the forward edge of the batten is a dowel or similar rod 22, the ends of which are received in sockets in the end walls of the cabinet. This rod supports a series of record envelopes 23 in side by side relationship, each of the envelopes being mounted on a wire frame 24 which defines the three closed sides of the envelope leaving the envelope open on the front. The upper extremity of each frame is formed with a reverse U bend 24a providing an open loop which extends over the rod 22 and swingably supports the associated envelope.

To maintain the envelopes at uniformly spaced intervals along the rod and also keep them always in planes perpendicular to the rod, a set of three guides is provided. The first of these is an essentially L-shaped angle member 26 secured to the batten 19 and extending across the cabinet behind the rod; the downwardly depending vertical flange of this member is provided with laterally spaced vertically elongated slots 26a each of which receives the rearwardly projecting end 24a of one of the wire envelope frames. The opposite end of each frame is bent downwardly to form a finger 24b, these fingers being similarly received in horizontal elongated slots 27a of a channel guide member 27 which is mounted on the bottom of the cabinet so it extends across the cabinet just behind the lower door 15. The third guide is a diagonal bracket 28 having slots 28a which receive the upper rear corners of the envelope frames.

By this arrangement it will be seen that each envelope is maintained in a predetermined plane perpendicular to rod 22 but is capable of certain movement in this plane, the purpose of which will be described presently. This movement normally takes place about the supporting rod 22 as a hinge and is limited by the extent of travel that finger 24b enjoys in its associated slot 27a.

For purposes of indexing the records stored in the envelopes, the name of the musical composition on each record (or other suitable identification) is printed on a card 29 disposed under a transparent window 29a on the inside of the lower door 15, so when the door is opened, the names are opposite the envelopes in which the associated records appear.

Referring to Fig. 1, attention is directed to the fact that the weight of each swinging envelope assembly lies mainly in its wire frame (the envelope proper being formed of kraft paper, stiff fabric or the like which is relatively light) and that the conformation of the frame is such that the center of gravity of the assembly is located somewhat behind (i. e., to the right of) a vertical line extending downwardly from rod 22. Consequently, when the envelope is empty its tendency is to swing forward in order to bring its center of gravity nearer an aligned position under the rod, its forward movement being halted, however, before the center of gravity can reach a position directly under the rod due to finger 24b reaching the forward limit of travel allowed by the associated slot 27a. When a record 30 now is placed in the envelope, its weight distribution, together with that of the envelope assembly, is such that the center of gravity shifts to a point forward of rod 22 so that the envelope in consequence swings rearwardly to a position shown in Fig. 1.

Thus it is seen that whenever an envelope is empty, it will automatically occupy a forward position, while all of the envelopes containing records will occupy rearward positions. This greatly facilitates the return of records to their respective envelopes, since the removal of the record from an envelope automatically brings the empty envelope into prominence, marking the place where the record should be returned after it has been played.

If, for any reason, it is desired to remove an envelope from the cabinet (for example, when an envelope accidently is torn), this may be done easily. The lower door simply is opened in conventional fashion and the upper door is swung upwardly without pushing it all the way back into the cabinet; bar 20 now may be manually pivoted upwardly about its hinge so the open loop 24a of the upper end of the frame of the desired envelope can be drawn forward off of the bar 22, and the envelope removed from the cabinet. Normally, it will be seen that bar 20 hangs by gravity in front of the frame loops, preventing accidental displacement of them from bar 22; when the upper door is in position 14a, its rear edge rests on this bar and positively prevents the bar from swinging upwardly about its hinge, so when the cabinet is open in the fashion prescribed for removing records, it obviously is impossible for the envelope frames to leave rod 20.

From the foregoing it will be seen that the invention is one well adapted to attain all of the ends and objects hereinbefore set forth together with other advantages which are obvious and which are inherent to the structure disclosed.

It will be understood that certain features and subcombinations are of utility and may be employed without reference to other features and subcombinations. This is contemplated by and is within the scope of the appended claims.

Inasmuch as various possible modifications of the invention may be made without departing from the scope thereof, it is to be understood that all matter herein set forth or shown in the accompanying drawings is to be interpreted as illustrative and not in a limiting sense.

Having thus described my invention, I claim:

1. A storage device for disk-type phonograph records comprising a stationary horizontal support, a flat envelope having a rigid C-shaped frame along three closed sides of the envelope leaving the envelope open on the fourth side, one end of said frame being reversely bent upon itself to form an open loop extending over said support and carrying said envelope in depending relation to the support, slotted guide means maintaining said envelope in a predetermined vertical plane but permitting same to swing in said plane on said support, said guide means including a member beside said support having a vertically elongated slot to receive the reversely bent end of said frame, and a barrier normally positioned beside said support adjacent the reverse bend in said frame to prevent the open loop from leaving said support, said barrier being displaceable from said normal position to permit removal of said loop from the support.

2. A storage device for flat objects comprising a stationary horizontal support, a flat envelope having a rigid C-shaped frame along three closed sides of the envelope leaving the envelope open on the fourth side, one end of said frame being reversely bent upon itself to form a loop extending over said support and carrying said envelope in depending relationship to the support, the other end of said frame bent away from said envelope to provide a downwardly extending finger, a stationary member containing a horizontally elongated slot to receive said finger, guide means including said member and finger maintaining said envelope in a predetermined vertical plane aligned with the axis of said slot but permitting the envelope to swing in said plane on said support, the frame and envelope when empty having their center of gravity on one side of a vertical line extending through said support whereby said finger is urged toward one end of said slot, and the frame and envelope when loaded having their center of gravity on the other side of said line whereby said finger is urged toward the opposite end of said slot.

3. In a device for storing disk-type phonograph records, a cabinet, a support in said cabinet, a record receptacle having a hook extending over said support so the receptacle depends therefrom, a movable barrier normally positioned beside said support across the path said hook would have to travel to leave said support, and a door on said cabinet pivotally supported about a horizontal axis at the top of said opening, said door when swung upwardly and outwardly to a horizontal disposition being movable into said cabinet to engage said barrier and block movement thereof away from its normal position.

4. A storage device for disk-type phonograph records, comprising a cabinet having a front opening, a stationary horizontal rod in said cabinet, a plurality of flat envelopes each having a rigid C-shaped frame along three sides of the envelope and the envelope being open on the fourth side, the upper end of each frame being bent to extend upwardly from the envelope along the forward side of said rod and then rearwardly above the rod, thus forming a rearwardly open hook carrying the associated envelope in depending relation to said rod, which hook is removable from the rod by advancing the frame horizontally forward toward said front opening of the cabinet, and a barrier normally positioned on the same level as said rod and forwardly thereof in the path of said hooks to prevent the latter from leaving the rod, said barrier being displaceable upwardly from its normal position to permit removal of said hooks from the rod.

5. A storage device as in claim 4 having a stationary spacer strip immediately behind said rod and on approximately the same level, said strip having along its length a series of vertically elongated slots to receive the rearwardly bent ends of the hooks on the respective frames and thus prevent sliding of the said hooks along the rod.

6. A storage device for disk-type phonograph records comprising a support, an elongated horizontal rod carried by said support, a plurality of flat envelopes each having a rigid frame along three sides of the envelope and the envelope being open on the fourth side, one end of each frame bent to form a hook extending over said rod and carrying the associated envelope, whereby said envelopes swingably depend from said rod in parallel, side-by-side relation, and an elongate member carried by said support beside the rod in parallel relation thereto, said member containing a series of spaced apertures each positioned to receive a portion of one of said hooks, thereby to prevent sliding of the hooks longitudinally of the rod, and each aperture being elongated in the plane of its associated envelope to permit the envelope to swing in its own plane.

7. A storage device as in claim 6 wherein each of said frames has rigid therewith a finger projecting downwardly from the lower edge of its associated envelope, a stationary member carried by said support parallel to said rod and containing a series of spaced apertures to receive the respective fingers, each of said last apertures being elongated in a horizontal direction lying in the plane of the associated envelope.

8. A storage device for disk-type phonograph records, comprising a stationary support, a pair of guide plates, means anchoring each of said plates in predetermined fixed position relative to said support, a plurality of identical flat envelopes swingably depending from said support in parallel, side-by-side relationship, each envelope having a rigid C-shaped frame along three sides of the envelope and the envelope being open on the fourth side, said pair of stationary guide plates disposed at right angles to the planes of the respective envelopes, one of said plates located adjacent the horizontally aligned lower ends of said frames and containing a series of slots to receive said ends, the other plate being located adjacent corresponding horizontally aligned bight portions of the frames and containing a series of slots to receive said portions, the slots that receive each frame being elongated in a direction lying in the plane of that frame to permit movement of the associated envelope in said plane while preventing lateral displacement or canting thereof, each frame and envelope when empty having their center of gravity on one side of a vertical line extending through said support and when loaded having their center of gravity on the other side of said line whereby the envelope tends to swing in opposite directions depending upon whether it is loaded or unloaded.

9. A storage device for disk-type phonograph records, comprising a stationary support, a pair of guide plates, means anchoring each of said plates in predetermined fixed position relative to said support, a plurality of identical flat envelopes swingably depending from said support in parallel, side-by-side relationship, each envelope having a rigid C-shaped frame along three sides of the envelope and the envelope being open on the fourth side, said pair of stationary guide plates disposed at right angles to the planes of the respective envelopes, one of said plates located adjacent the horizontally aligned upper ends of said frames and containing a series of slots to receive said ends, the other plate being located adjacent corresponding horizontally aligned bight portions of the frames and containing a series of slots to receive said portions, the slots that receive each frame being elongated in a direction lying in the plane of that frame to permit movement of the associated envelope in said plane while preventing lateral displacement or canting thereof, each frame and envelope when empty having their center of gravity on one side of a vertical line extending through said support and when loaded having their center of gravity on the other side of said line whereby the envelope tends to swing in opposite directions depending upon whether it is loaded or unloaded.

10. A storage device for disk-type phonograph records comprising a stationary support, three guide plates, means anchoring each of said plates in predetermined fixed position relative to said support, a plurality of identical flat envelopes swingably depending from said support in parallel, side-by-side relationship, each envelope having a rigid C-shaped frame along three sides of the envelope and the envelope being open on the fourth side, said stationary guide plates disposed at right angles to the planes of the respective envelopes, one of said plates located adjacent the horizontally aligned lower ends of said frames and containing a series of slots to receive said ends, the second plate being located adjacent the horizontally aligned upper ends of said frames and containing a series of slots to receive said upper ends, the third plate being located adjacent corresponding horizontally aligned bight portions of the frames and containing a series of slots to receive said portions, all of the slots that receive each frame being elongated in a direction lying in the plane of that frame to permit movement of the associated envelope in said plane while preventing lateral displacement or canting thereof, each frame and envelope when empty having their center of gravity on one side of a vertical line extending through said support and when loaded having their center of gravity on the other side of said line whereby the envelope tends to swing in opposite directions depending upon whether it is loaded or unloaded.

11. A storage device for disk-type phonograph records comprising a support, an elongated horizontal rod carried by said support, a plurality of flat envelopes, each having a rigid C-shaped frame along three sides of the envelope and the envelope being open on the fourth side, one end of each frame being bent to form a hook extending over said rod and carrying the associated envelope, whereby said envelopes swingably depend from said rod in parallel, side-by-side relation, a set of stationary separators carried by said support and positioned between each pair of adjacent frames, the separators of each set being disposed in the same vertical plane and engaging the adjacent frames at at least three spaced-apart points on each frame whereby each frame is limited to swinging movement in a predetermined vertical plane, all of said separators being spaced from said envelopes and therefore free of frictional contact with the envelopes in all positions of the latter.

12. A storage device for disk-type phonograph records comprising a support, an elongated horizontal rod carried by said support, a plurality of flat envelopes, each having a rigid C-shaped frame along three sides of the envelope and the envelope being open on the fourth side, one end of each frame being bent to form a hook extending over said rod and carrying the associated envelope, whereby said envelopes swingably depend from said rod in parallel, side-by-side relation, a set of sationary separators carried by said support and positioned between each pair of adjacent frames, the separators of each set being disposed in the same vertical plane and engaging the adjacent frames at at least three spaced-apart points on each frame whereby each frame is limited to swinging movement in a predetermined vertical plane, all of said separators being spaced from said envelopes and therefore free of frictional contact with the envelopes in all positions of the latter, each frame and envelope when empty having their center of gravity on one side of a vertical line extending through said rod and when loaded having their center of gravity on the other side of said line whereby the envelope tends to swing in opposite directions, depending upon whether it is loaded or unloaded.

References Cited in the file of this patent

UNITED STATES PATENTS

| Number | Name | Date |
|---|---|---|
| 1,341,412 | Brown | May 25, 1920 |
| 1,403,939 | Cox | Jan. 17, 1922 |
| 1,480,939 | Hand | Jan. 15, 1924 |
| 1,728,919 | Batts | Sept. 24, 1929 |
| 2,330,173 | Gordon | Sept. 21, 1943 |
| 2,482,692 | Quales | Sept. 20, 1949 |